United States Patent [19]

Spector

[11] Patent Number: 4,653,225
[45] Date of Patent: Mar. 31, 1987

[54] SEED STARTER ASSEMBLY

[76] Inventor: Donald Spector, 380 Mountain Rd., Union City, N.J. 07087

[21] Appl. No.: 800,961

[22] Filed: Nov. 22, 1985

[51] Int. Cl.$^4$ .............................................. A01G 9/02
[52] U.S. Cl. ......................................................... 47/84
[58] Field of Search ................. 47/DIG. 9, 84, 77, 56, 47/57.6; 426/404, 392

[56] References Cited

U.S. PATENT DOCUMENTS

| | | | |
|---|---|---|---|
| 2,083,065 | 6/1937 | Heyl | 47/DIG. 9 |
| 2,097,929 | 11/1937 | Lovett, Jr. | 47/84 |
| 2,141,402 | 12/1938 | Muller | 63/DIG. 2 |
| 2,313,057 | 3/1943 | Fischer | 47/DIG. 9 |
| 2,518,711 | 8/1950 | Mulford | 47/84 |
| 3,961,444 | 6/1976 | Skaife | 47/84 |
| 3,971,160 | 7/1976 | Vajtay | 47/84 |
| 4,241,537 | 12/1980 | Wood | 47/84 |
| 4,424,645 | 1/1984 | Rannali | 47/84 |

FOREIGN PATENT DOCUMENTS 693069  6/1953  United Kingdom ..................... 47/84

Primary Examiner—Robert A. Hafer
Assistant Examiner—Bradley M. Lewis
Attorney, Agent, or Firm—Michael Ebert

[57] ABSTRACT

A botanical seed starter assembly for ornamental flowers in which the dormant seeds for a given type of flower or an assortment thereof are dispersed in a matrix of inert particulates in a small box having a removable seal. Printed on the box is a picture of the flower or the assortment thereof to be derived from the seeds. The particulates in the matrix include particles formed of absorbent material which are impregnated with a perfume whose fragrance corresponds to the natural fragrance of the flowers to be grown. When the seal is removed and the matrix is watered, the seeds therein will in due course proceed to sprout. In the more or less prolonged period during which germination is in progress and no sprouts are yet visible, the user during this period will not only experience the fragrance of the perfume, but will relate this fragrance to the flower picture associated therewith, and not have to wait for the flowers to come into being to enjoy them.

3 Claims, 3 Drawing Figures

SEED STARTER ASSEMBLY

BACKGROUND OF INVENTION

1. Field of Invention

This invention relates generally to botanical seed starters for ornamental plants, and more particularly to a seed starter assembly which affords interrelated pleasing visual and olfactory sensory impression, which impressions are made before the seeds in the assembly sprout and are visible.

2. Status of Art

A flower is the name given to that part of a botanical seed plant containing the reproductive organs of the plant and the associated protective and attractive parts thereof. Flowers pollinated by insects have one or more nectaries that secrete a sugar solution. Substances that give off floral odors which are mostly essential oils, ordinarily exist close to the nectar producing region. Most insect-pollinated plants have visual clues as well as odors to attract the pollinators to the plant and guide them to the nectar.

Flowers have been cultivated and bred since time immorial. The beauty and perfume of flowers are celebrated in legend and folklore, and many flowers have symbolic associations. Thus, the lotus flower plays an important role in oriental religion; the rose is associated with heraldry; and in the United States, each state has a state flower.

The physical form and color of a flower is inseparable from its odor. Hence, the visual impression made by a flower is intimately associated with its olfactory effect, as in the case of a rose or a violet. Thus, if one were to pick up a carnation and detect no smell at all, this effect would be disturbing, which is why an artificial flower, however perfect the copy, is "dead" and generally unappealing.

Without a seed to start with, one does not obtain a flower. The seed is the ripened pistol of a flower and is composed of the plant embryo, varying amounts of stored food (endosperm) and an outer seed coat. A dry seed is in a dormant state, and in order for the seed to germinate and sprout, it is necessary that the seed be planted in a moist environment. It is not necessary that this environment include plant nutrients, for the seed makes use of its own stored food. But for continued growth, it is necessary to transfer the sprout to soil containing the necessary nutrients.

Seed starters are known in which seeds for a given flower, such as a violet, are planted in a small box containing soil. By maintaining the soil in a moist condition, the seed will in due course sprout, after which the sprout is transferred to a garden or to a large flower pot filled with soil. Because the period necessary for the seeds to sprout in the starter is more or less prolonged, the conventional seed starter during this period is strictly utilitarian, for it affords neither a pleasing visual nor an olfactory sensation.

The use of conventional starters is a frustrating experience to the typical user, for it often takes many weeks for the seeds to sprout, and during this period there is no visual evidence that anything is happening. And while seed starters are much less expensive than ornamental plants that have already flowered, many plant lovers, to avoid such frustration, will purchase the more costly plants.

SUMMARY OF INVENTION

In view of the foregoing, the main object of this invention is to provide a seed starter assembly for ornamental plants which affords interrelated pleasing visual and olfactory sensory impressions, which impressions are made before the seeds in the assembly sprout and are visible.

More particularly, an object of this invention is to provide an assembly of the above type in which are dispersed seeds for a given type of flower or an assortment thereof, which assembly exudes a perfume whose fragrance corresponding to the natural fragrance of the flowers to be produced.

A significant advantage of the invention is that the seed starter is no longer purely utilitarian in nature, for in the more or less prolonged period in which no sprouts are visible, the assembly affords visual and olfactory sensory impressions similar to those yielded by the actual flowers, thereby avoiding the frustration attending the use of conventional seed starters.

Briefly stated, these objects are attained in a botanical seed starter assembly for ornamental flowers in which the dormant seeds for a given type of flower or an assortment thereof are dispersed in a matrix of inert particulates in a small box having a removable seal. Printed on the box is a picture of the flower or the assortment thereof to be derived from the seeds. The particulates in the matrix include particles formed of absorbent material which are impregnated with a perfume whose fragrance corresponds to the natural fragrance of the flowers to be grown. When the seal is removed and the matrix is watered, the seeds therein will in due course proceed to sprout. In the more or less prolonged period during which germination is in progress and no sprouts are yet visible, the user during this period will not only experience the fragrance of the perfume, but will relate this fragrance to the flower picture associated therewith, and not have to wait for the flowers to come into being to enjoy them.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
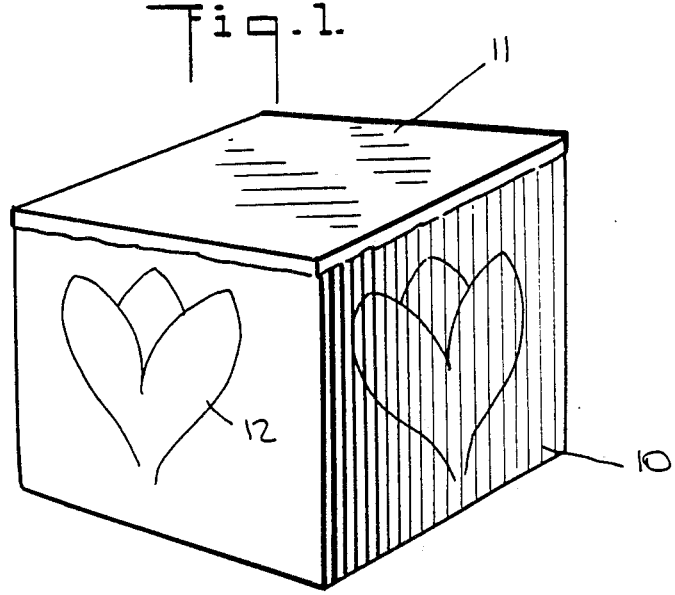
FIG. 1 is a perspective view of a seed starter assembly having a matrix therein in accordance with the invention.
Figure 2:
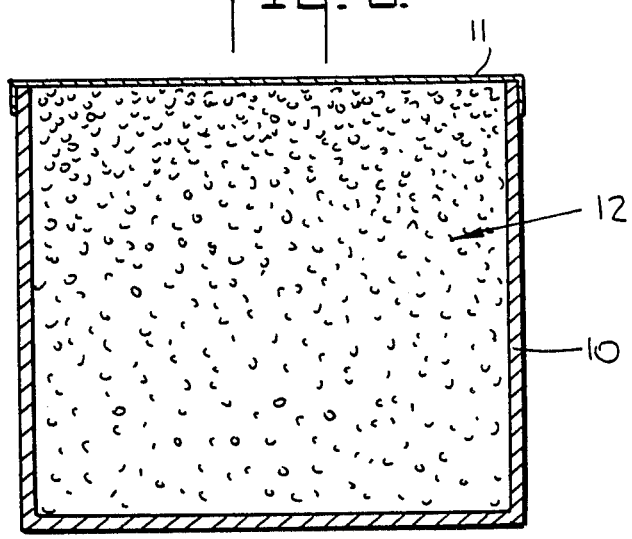
FIG. 2 is a section taken through the box.

Referring now to FIGS. 1 and 2, there is shown a seed starter assembly in accordance with the invention, the assembly including an open box 10 having a removable seal 11 thereon which in practice may be a sheet of metal foil or plastic film whose margins are bonded to the sides of the box to hermetically seal the contents thereof. To remove the seal, one has merely to puncture the foil or covering film and strip it off the box. In practice, the seal may also take the form of a removable cover. The box may simply be a molded synthetic plastic box of vinyl or other material non-reactive with perfume.

Printed on one or on all sides of the box is a picture 12 of the flower to be derived from the seeds contained in the box. Thus, if the seeds are for violets, then the picture will be that of a violet flower in bloom. And if the seeds are an assortment producing a potpourri of flowers, then the picture will illustrate this potpourri. The picture is preferably a colored representation so that it has both the shape and color of a natural flower.

Figure 3:
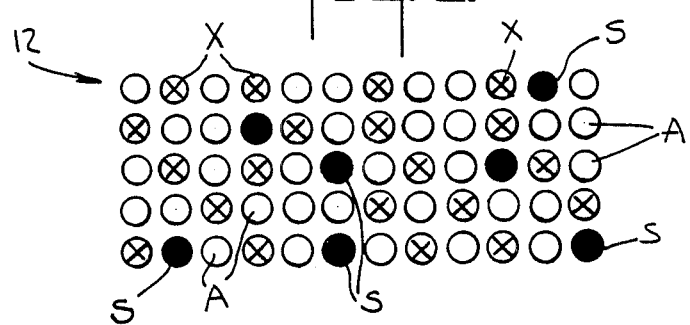
FIG. 3 is an enlarged view of a batch of particles included in the matrix.

The seeds are dispersed in a matrix of inert particulates, generally designated by numeral 12. These seeds are represented by the black particles S in FIG. 3. The seed particles are dispersed in a mix composed of non-absorbent particles X and absorbent particles A.

The absorbent particles A are preferably formed of vermiculite. These are hydrous silicates derived from mica whose granules expand greatly at high temperatures to provide lightweight, highly water-absorbent particulates that are often used as a mulch. The relatively non-absorbent particles are preferably of perlite, a volcanic glass which when expanded by heat forms a lightweight aggregate which is often used in concrete or plaster.

The matrix is impregnated with a perfume whose fragrance matches or closely corresponds to the natural odor of the flower to which the seed is related. If, therefore, the assembly includes carnation or violet seeds, then the appropriate perfume will be a carnation or a violet fragrance, as the case may be. And if the seeds provide a potpourri of different flowers, the perfume will be a mixture of fragrances corresponding to the different flowers.

The aroma of perfumes was originally derived from the essential oils of plants. However, since the 19th century, chemists have succeeded in analyzing many essential oils and in creating thousands of synthetics to simulate almost the full spectrum of natural flower odors. Perfumes today are largely blends of natural and synthetic scents, and of fixatives which equalize vaporization and enhance pungency.

Because the box is sealed, no perfume is lost therefrom as a result of evaporation. When the box is unsealed to render the seed starter operative, water is then added to the matrix which is absorbed thereby to provide a moist matrix. The non-absorbent particles serve to prevent packing of the matrix and to maintain the seeds well separated. The water to some degree displaces the oil-based perfume which rises toward the surface of the matrix.

As pointed out previously, the natural germination process is fairly slow and may last several weeks. But during this germination period when there is no visible sprouting, the box exudes the aroma of the flower or flowers to be produced. This aroma combined with the picture of the flower or flowers on the box sides is gratifying to the user, for it tells him what to anticipate both in visual and olfactory terms, and affords pleasure while he is awaiting the arrival of the sprouts. There is no need during the germination period to add plant nutrients, for the seeds then make use of their stored food. However, if one wishes a young, healthy plant before transplanting the flowers, one may, after sprouting, continue to water and also add plant nutrients, preferably in liquid form.

While there has been shown and described a preferred embodiment of a seed starter assembly in accordance with the invention, it will be appreciated that many changes and modifications may be made therein without, however, departing from the essential spirit thereof. And the box, instead of being in standard form, may be molded in the shape of the flower produced by the seeds contained therein.

Instead of using a matrix having absorbent particles and seeds dispersed throughout the matrix, use may be made of absorbent particles having seeds embedded therein. These are preferably constituted by pellets of peat moss or sphagnum that has been dehydrated, the pellets expanding when water is added thereto. The seeds in this instance are embedded in the pellets rather than being loosely dispersed in the matrix.

Instead of having a perfume whose aroma corresponds to the natural fragrance of the flowers, one can carry out the invention by thematically relating the perfume odor to the flowers. Thus, if the flowers to emerge from the seeds are those commonly associated with a given country or culture, the thematically-related perfume would be one whose bouquet or aroma also had a known association with the country or culture.

For example, if the flowers are those commonly found in or associated with Mexico, the aroma would be that of chili peppers; and if the flowers are those associated with Italy, the aroma could be that of pizza or espresso coffee. And to complete the thematic connection, the pot would be decorated in an appropriate manner to suggest the country or culture. Thus, in the case of Italy, the national colors would be used in printing on the pot, and the pot, in this instance, may show the Coliseum, the tower of Pisa or some other structure or site symbolic of Italy. Since many flowers have symbolic associations, with the present invention these associations are reflected in the appearance of the seed starter pot and in the aroma exuded therefrom.

I claim:

1. A botanical seed starter assembly comprising a box housing a matrix of inert particulates having dispersed therein seeds for a given type of flower or an assortment thereof, said matrix including water-absorbent vermiculite particles which are impregnated with a perfume whose aroma corresponds to the natural fragrance of the flowers so that during the period in which the matrix is maintained in a moist condition to promote germination and before the seeds visibly sprout, the box exudes the aroma of the expected flowers, said box having printed thereon a picture of the flowers to be derived from the seed so that the user during the period both sees and smells the flowers not yet grown, and a removable hermetic seal covering said box to prevent evaporation of said perfume.

2. An assembly as set forth in claim 1, wherein said seal is a metal foil.

3. An assembly as set forth in claim 1, wherein said seal is a plastic film.

* * * * *